United States Patent
Verrilli et al.

(10) Patent No.: US 10,936,943 B2
(45) Date of Patent: Mar. 2, 2021

(54) PROVIDING FLEXIBLE MATRIX PROCESSORS FOR PERFORMING NEURAL NETWORK CONVOLUTION IN MATRIX-PROCESSOR-BASED DEVICES

(71) Applicant: QUALCOMM Incorporated, San Diego, CA (US)

(72) Inventors: Colin Beaton Verrilli, Apex, NC (US); Mattheus Cornelis Antonius Adrianus Heddes, Woodinville, WA (US); Natarajan Vaidhyanathan, Carrboro, NC (US); Koustav Bhattacharya, Austin, TX (US); Robert Dreyer, Menlo Park, CA (US)

(73) Assignee: Qualcomm Incorporated, San Diego, CA (US)

( * ) Notice: Subject to any disclaimer, the term of this patent is extended or adjusted under 35 U.S.C. 154(b) by 181 days.

(21) Appl. No.: 16/117,952

(22) Filed: Aug. 30, 2018

(65) Prior Publication Data

US 2019/0065942 A1 Feb. 28, 2019

Related U.S. Application Data

(60) Provisional application No. 62/552,907, filed on Aug. 31, 2017.

(51) Int. Cl.
*G06N 3/063* (2006.01)
*G06F 15/80* (2006.01)
(Continued)

(52) U.S. Cl.
CPC ......... *G06N 3/063* (2013.01); *G06F 15/8023* (2013.01); *G06F 17/16* (2013.01);
(Continued)

(58) Field of Classification Search
None
See application file for complete search history.

(56) References Cited

U.S. PATENT DOCUMENTS

| 5,530,661 | A | * | 6/1996 | Garbe | ............... | G06F 1/03 |
|---|---|---|---|---|---|---|
| | | | | | | 708/319 |
| 2014/0181171 | A1 | * | 6/2014 | Dourbal | ............ | G06F 17/16 |
| | | | | | | 708/607 |
| 2016/0239706 | A1 | | 8/2016 | Dijkman et al. | | |

FOREIGN PATENT DOCUMENTS

CN 106709441 A 5/2017

OTHER PUBLICATIONS

Chetlur, Sharon et al., "cuDNN: Efficient Primitives for Deep Learning," arXiv:1410.0759v3, Dec. 18, 2014, XP055260407, 9 pages.

(Continued)

*Primary Examiner* — Michael D. Yaary
(74) *Attorney, Agent, or Firm* — Withrow & Terranova, PLLC (57) ABSTRACT

Providing flexible matrix processors for performing neural network convolution in matrix-processor-based devices is disclosed. In this regard, a matrix-processor-based device provides a central processing unit (CPU) and a matrix processor. The matrix processor reorganizes a plurality of weight matrices and a plurality of input matrices into swizzled weight matrices and swizzled input matrices, respectively, that have regular dimensions natively supported by the matrix processor. The matrix-processor-based device then performs a convolution operation using the matrix processor to perform matrix multiplication/accumulation operations for the regular dimensions of the weight matrices and the input matrices, and further uses the CPU to execute instructions for handling the irregular dimensions of the weight matrices and the input matrices (e.g., by execut- (Continued)

ing a series of nested loops, as a non-limiting example). The matrix-processor-based device thus provides efficient hardware acceleration by taking advantage of dimensional regularity, while maintaining the flexibility to handle different variations of convolution.

20 Claims, 10 Drawing Sheets

(51) Int. Cl.
    *G06F 17/16*     (2006.01)
    *G06N 3/04*     (2006.01)
(52) U.S. Cl.
    CPC .............. *G06N 3/04* (2013.01); *G06N 3/0454* (2013.01); *G06N 3/0445* (2013.01)

(56) References Cited

OTHER PUBLICATIONS

Moskewicz, Matthew W., "Implementing Efficient, Portable Computations for Machine Learning," Thesis, University of California, Berkeley, Jun. 1, 2017, XP055527792, 156 pages, Retrieved from the Internet: URL: https://escholarship.org/content/qt4nz902vt/qt4nz902vt.pdf [retrieved on Nov. 28, 2018].

Motamedi, Mohammad et al., "Fast and Energy-efficient CNN Inference on IoT Devices," Arxiv.Org, Cornell University Library, 201 Olin Library Cornell University Ithaca, NY 14853, Nov. 22, 2016, XP080733584, 7 pages.

Zhang, Jiyuan et al., "High Performance Zero-memory Overhead Direct Convolutions," Proceedings of Thirty-fifth International Conference on Machine Learning ICML 2018, Jul. 12, 2018, 10 pages.

International Search Report and Written Opinion for PCT/US2018/049105, dated Dec. 7, 2018, 17 pages.

Author Unknown, "im2col," The MathWorks, Inc., available at least as early as Jul. 28, 2017, 2 pages, https://www.mathworks.com/help/images/ref/im2col.html?requestedDomain=www.mathworks.com.

Liu, Shaoli et al., "Cambricon: An Instruction Set Architecture for Neural Networks," 2016 ACM/IEEE 43rd Annual International Symposium on Computer Architecture, 2016, pp. 393-405.

Warden, Pete, "Why GEMM is at the heart of deep learning," Pete Warden's Blog, Apr. 20, 2015, 11 pages, https://petewarden.com/2015/04/20/why-gemm-is-at-the-heart-of-deep-learning/.

International Preliminary Report on Patentability for PCT/US2018/049105, dated Mar. 12, 2020, 10 pages.

* cited by examiner

```
300(0) ─── for b=1 to B
  300(1) ─── for n=1 to N
    300(2) ─── for i=1 to I
      300(3) ─── for w=1 to W-KW+1
        300(4) ─── for h=1 to H-KH+1
          300(5) ─── for kw=1 to KW
            inw= w+kw-1
            300(6) ─── for kh=1 to KH
              inh= h+kh-1
              out[b][n][w][h] += in[b][i][inw][inh] * weight[n][i][kh][kw]
```

```
500(0)──── for w=1 to W
  500(1)──── for h=1 to H                    ┐
    500(2)──── for kw=1 to KW                │ IRREGULAR DIMENSIONS
      500(3)──── for kh=1 to KH              ┘ PROCESSED BY CPU (146)
        500(4)──── for i=1 to I              ┐
          500(5)──── for b=1 to B            │ REGULAR DIMENSIONS
            500(6)──── for n=1 to N          │ PROCESSED BY MATRIX
              inh= h+kh-1                    ┘ PROCESSOR (144(0)-144(M))
              out[b][n][w][h] += in[b][i][inw][inh] * weight[n][i][kh][kw]
```

PROVIDING FLEXIBLE MATRIX PROCESSORS FOR PERFORMING NEURAL NETWORK CONVOLUTION IN MATRIX-PROCESSOR-BASED DEVICES

PRIORITY APPLICATION

The present application claims priority under 35 U.S.C. § 119(e) to U.S. Provisional Patent Application Ser. No. 62/552,907 entitled "PROVIDING FLEXIBLE DEEP LEARNING COMPUTE UNITS IN PROCESSOR-BASED SYSTEMS" and filed on Aug. 31, 2017, the contents of which is incorporated herein by reference in its entirety.

BACKGROUND

I. Field of the Disclosure

The technology of the disclosure relates generally to machine learning in matrix-processor-based devices, and, in particular, to techniques and apparatus for facilitating neural network convolution.

II. Background

The field of machine learning is directed to developing and studying algorithms that can make data-driven predictions or decisions by building a model from sample inputs. Machine learning may be applied to computing tasks where designing and programming explicit algorithms with acceptable performance is difficult or impracticable. One category of machine learning techniques, known as "deep learning," employs artificial neural networks (ANNs) containing multiple hidden layers to perform tasks such as pattern analysis and classification. The ANNs are first "trained" by determining operating parameters based on examples of typical inputs and corresponding desired outputs. The ANNs may then perform "inference," in which the determined operating parameters are used to classify, recognize, and/or process new inputs.

The wide variety of ANNs used for deep learning presents challenges in providing hardware flexible enough to handle all computational scenarios while still maintaining high efficiency. For example, ANNs may consist of many types and variations of computational layers, including convolutional layers, fully connected layers, and recurrent neural network (RNN) layers. The layers of an ANN also may be of non-standard sizes (e.g., where one or more of the layer dimensions are not a power of 2, such as a layer comprising a 17×17 matrix, or a filter having a size of 3×3). Moreover, an ANN configured to address convolution by splitting matrices into smaller submatrices may encounter the "halo problem," which results from incomplete partial sums along the edges of the input matrix, and which requires data to be shared among matrix processors handling each submatrix. The process of training an ANN may introduce additional variations that hardware must be capable of handling.

Providing flexible and efficient mechanisms for performing the process of convolution (i.e., image processing by adding each element of an input image to its local neighbors and weighing by a kernel) may prove particularly challenging. One approach to handling convolution is through the use of graphics processing units (GPUs) that provide a preprocessing step called "im2col" to convert a convolution problem to a pure matrix multiplication operation by duplicating data. However, this approach tends to waste memory and bandwidth, and the extra preprocessing step (and its inverse) are required for each ANN layer. Other custom convolution hardware accelerators have been proposed, but such custom solutions may handle only limited types of convolution. Thus, it is desirable to provide accelerated hardware for convolution processing that is both flexible and efficient, and that allows the same matrix processor to be used for convolution neural network (CNN) layers, fully connected layers, and recurrent neural network (RNN) layers.

SUMMARY OF THE DISCLOSURE

Aspects disclosed in the detailed description include providing flexible matrix processors for performing neural network convolution in matrix-processor-based devices. In this regard, in one aspect, a matrix-processor-based device provides a central processing unit (CPU) and a matrix processor. The matrix processor is configured to reorganize a plurality of weight matrices and a plurality of input matrices into swizzled weight matrices and swizzled input matrices, respectively, that have regular dimensions natively supported by the matrix processor. The matrix-processor-based device then performs a convolution operation using the matrix processor to perform matrix multiplication/accumulation operations for the regular dimensions of the weight matrices and the input matrices, and further uses the CPU to execute instructions for handling the irregular dimensions of the weight matrices and the input matrices (e.g., by executing a series of nested loops, as a non-limiting example). In this manner, the matrix-processor-based device provides efficient hardware acceleration by taking advantage of dimensional regularity, while maintaining the flexibility to handle different variations of convolution.

In another aspect, a matrix-processor-based device for performing neural network convolution is provided. The matrix-processor-based device comprises a central processing unit (CPU) and a matrix processor. The matrix processor is configured to reorganize a plurality of weight matrices into a plurality of swizzled weight matrices having regular dimensions that are natively supported by the matrix processor. The matrix processor is further configured to reorganize a plurality of input matrices into a plurality of swizzled input matrices having regular dimensions that are natively supported by the matrix processor. The matrix-processor-based device is configured to perform a convolution operation on the plurality of swizzled weight matrices and the plurality of swizzled input matrices to generate a plurality of output matrices by being configured to execute, by the CPU of the matrix-processor-based device, a plurality of nested loops corresponding to a plurality of irregular dimensions. The matrix-processor-based device is further configured to perform the convolution operation by being configured to execute, by the matrix processor of the matrix-processor-based device, a plurality of matrix multiplication/accumulation operations, corresponding to a plurality of regular dimensions of the convolution operation.

In another aspect, a matrix-processor-based device for performing neural network convolution is provided. The matrix-processor-based device comprises a means for reorganizing a plurality of weight matrices into a plurality of swizzled weight matrices having regular dimensions that are natively supported by a matrix processor of the matrix-processor-based device. The matrix-processor-based device further comprises a means for reorganizing a plurality of input matrices into a plurality of swizzled input matrices having regular dimensions that are natively supported by the matrix processor. The matrix-processor-based device also comprises a means for performing a convolution operation on the plurality of swizzled weight matrices and the plurality of swizzled input matrices to generate a plurality of output matrices. The means for performing the convolution operation comprises a means for executing a plurality of nested loops corresponding to a plurality of irregular dimensions. The means for performing the convolution operation further comprises a means for executing a plurality of matrix multiplication/accumulation operations, corresponding to a plurality of regular dimensions of the convolution operation.

In another aspect, a method for performing neural network convolution is provided. The method comprises reorganizing, by a matrix processor of a matrix-processor-based device, a plurality of weight matrices into a plurality of swizzled weight matrices having regular dimensions that are natively supported by the matrix processor. The method further comprises reorganizing, by the matrix processor, a plurality of input matrices into a plurality of swizzled input matrices having regular dimensions that are natively supported by the matrix processor. The method also comprises performing a convolution operation on the plurality of swizzled weight matrices and the plurality of swizzled input matrices to generate a plurality of output matrices. Performing the convolution operation comprises executing, by a central processing unit (CPU) of the matrix-processor-based device, a plurality of nested loops corresponding to a plurality of irregular dimensions. Performing the convolution operation further comprises executing, by the matrix processor of the matrix-processor-based device, a plurality of matrix multiplication/accumulation operations, corresponding to a plurality of regular dimensions of the convolution operation.

DETAILED DESCRIPTION

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Figure 1A:
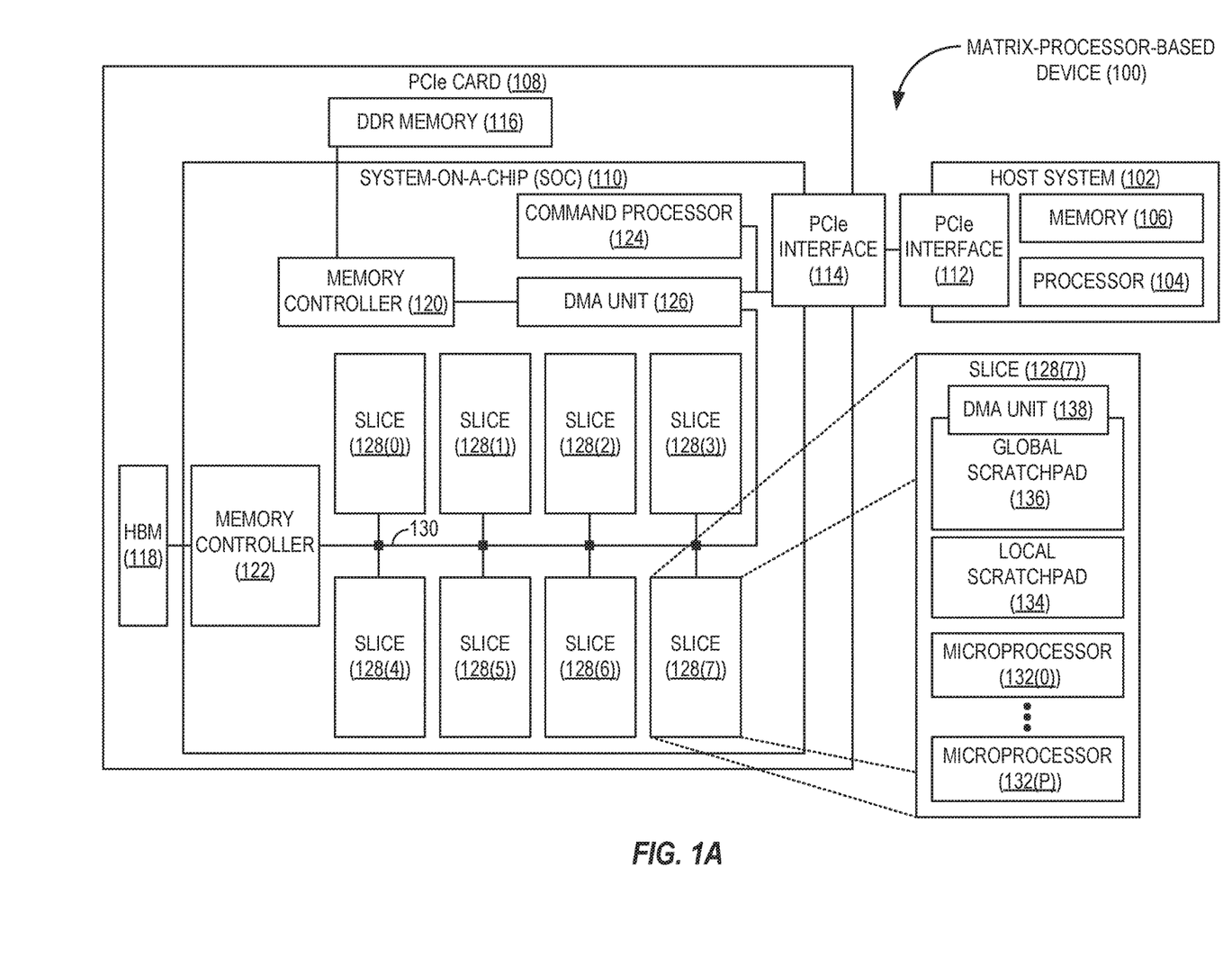
FIGS. 1A and 1B are block diagrams of an exemplary matrix-processor-based device for performing neural network convolution operations.
Figure 1B:
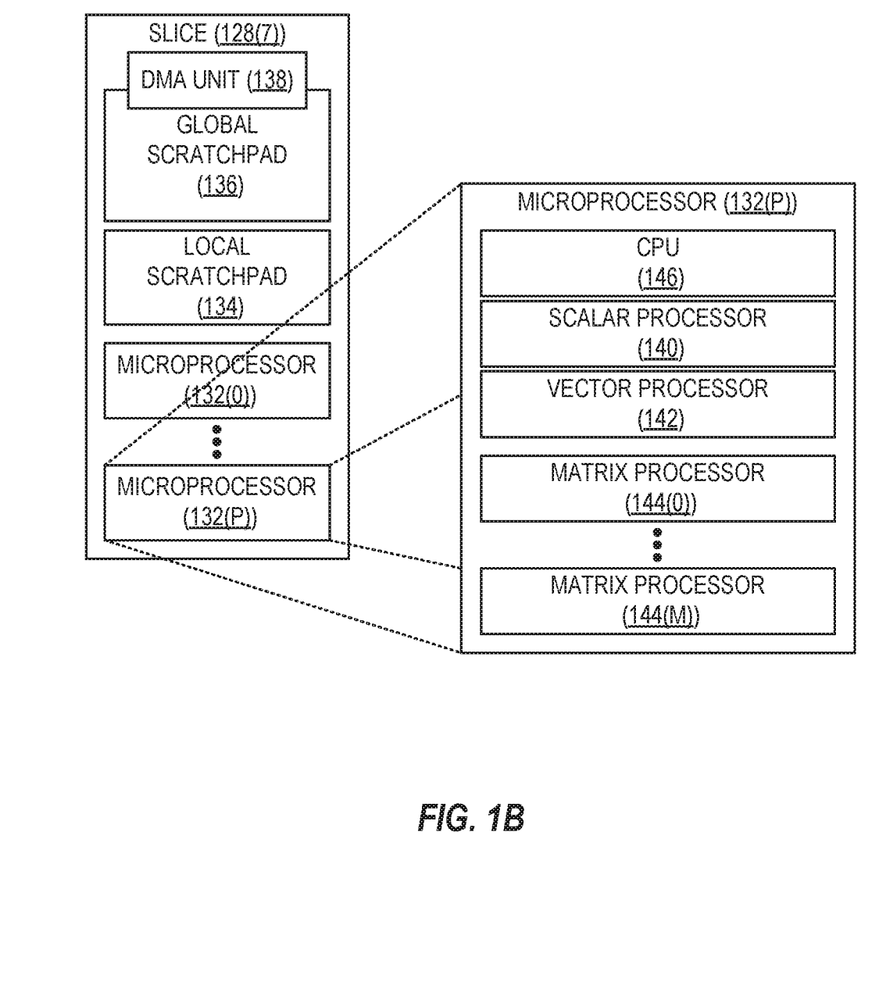

Aspects disclosed in the detailed description include providing flexible matrix processors for performing neural network convolution in matrix-processor-based devices. In this regard, FIGS. 1A and 1B illustrate an exemplary matrix-processor-based device 100 configured to provide flexible and efficient convolutional processing. Referring to FIG. 1A, the matrix-processor-based device 100 provides a host system 102, which in some aspects may comprise an ARM®- or INTEL® x86-based server computer. The host system 102 includes a processor 104 (e.g., one or more central processing units (CPUs), processors, and/or processor cores) and memory 106 (e.g., double data rate (DDR) synchronous dynamic random access memory (SDRAM) (DDR SDRAM)). The matrix-processor-based device 100 further provides a Peripheral Component Interconnect Express (PCIe) card 108, on which a system-on-a-chip (SoC) 110 is configured to communicate with the host system 102 via a PCIe interface 112 of the host system 102 and a PCIe interface 114 of the SoC 110. The PCIe card 108 also includes DDR memory 116 and high-bandwidth memory (HBM) 118, which interface with the SoC 110 via a memory controller 120 and a memory controller 122, respectively.

The SoC 110 provides a command processor 124, which in some aspects may comprise a conventional processor such as an ARM®- or INTEL® x86-based processor. The SoC 110 also includes a direct memory access (DMA) unit 126 that is configured to move data to and from the DDR memory 116 and the PCIe interface 114, and thereby to and from the host system 102. The SoC 110 of FIGS. 1A and 1B provides eight (8) processor slices ("slices") 128(0)-128(7), which are interconnected by a network-on-chip (NoC) 130. It is to be understood that, in some aspects, the SoC 110 may include more or fewer slices 128(0)-128(7) than illustrated in FIGS. 1A and 1B.

To illustrate the constituent elements of the slices 128(0)-128(7), FIGS. 1A and 1B shows an expanded view of the slice 128(7). The slice 128(7) comprises a plurality of microprocessors 132(0)-132(P), along with a local scratchpad 134 and a global scratchpad 136. The local scratchpad 134 is a high-bandwidth memory that is accessible only by the microprocessors 132(0)-132(P) of the slice 128(7). In contrast, the global scratchpad 136 is a lower-bandwidth memory that is accessible by any of the slices 128(0)-128(7). To move data into and out of the local scratchpad 134 and the global scratchpad 136, the slice 128(7) provides a DMA unit 138, which is communicatively coupled to the NoC 130. It is to be understood that, in this example, each of the slices 128(0)-128(6) include elements corresponding to the elements of the slice 128(7) described above.

FIG. 1B provides a more detailed view of the constituent elements of the microprocessors 132(0)-132(P) of the slice 128(7) of FIGS. 1A and 1B, using the microprocessor 132(P) as an example. As seen in FIG. 1B, the microprocessor 132(P) provides a scalar processor 140 and a vector processor 142. The microprocessor 132(P) further provides a plurality of matrix processors 144(0)-144(M). In the example of FIG. 1B, the matrix processors 144(0)-144(M) are configured to use 16-bit floating-point precision, as higher precision is both unnecessary for machine learning applications and also results in reduced performance. Note that, in some aspects, the matrix processors 144(0)-144(M) may be configured to use other levels and types of precision, such as 8-bit integer precision, as a non-limiting example. The scalar processor 140, the vector processor 142, and the matrix processors 144(0)-144(M) are controlled by a CPU 146, which in some aspects provides a specialized instruction set for matrix processing. It is to be understood that, in the example of FIG. 1B, each of the microprocessors 132(0)-132(P) includes elements corresponding to the elements of the microprocessor 132(P) described above.

The matrix-processor-based device 100 and its constituent elements as illustrated in FIGS. 1A and 1B may encompass any known digital logic elements, semiconductor circuits, processing cores, and/or memory structures, among other elements, or combinations thereof. Aspects described herein are not restricted to any particular arrangement of elements, and the disclosed techniques may be easily extended to various structures and layouts on semiconductor sockets or packages. It is to be understood that some aspects of the matrix-processor-based device 100 may include elements in addition to those illustrated in FIGS. 1A and 1B, and/or may omit some elements illustrated in FIGS. 1A and 1B.

Figure 2:
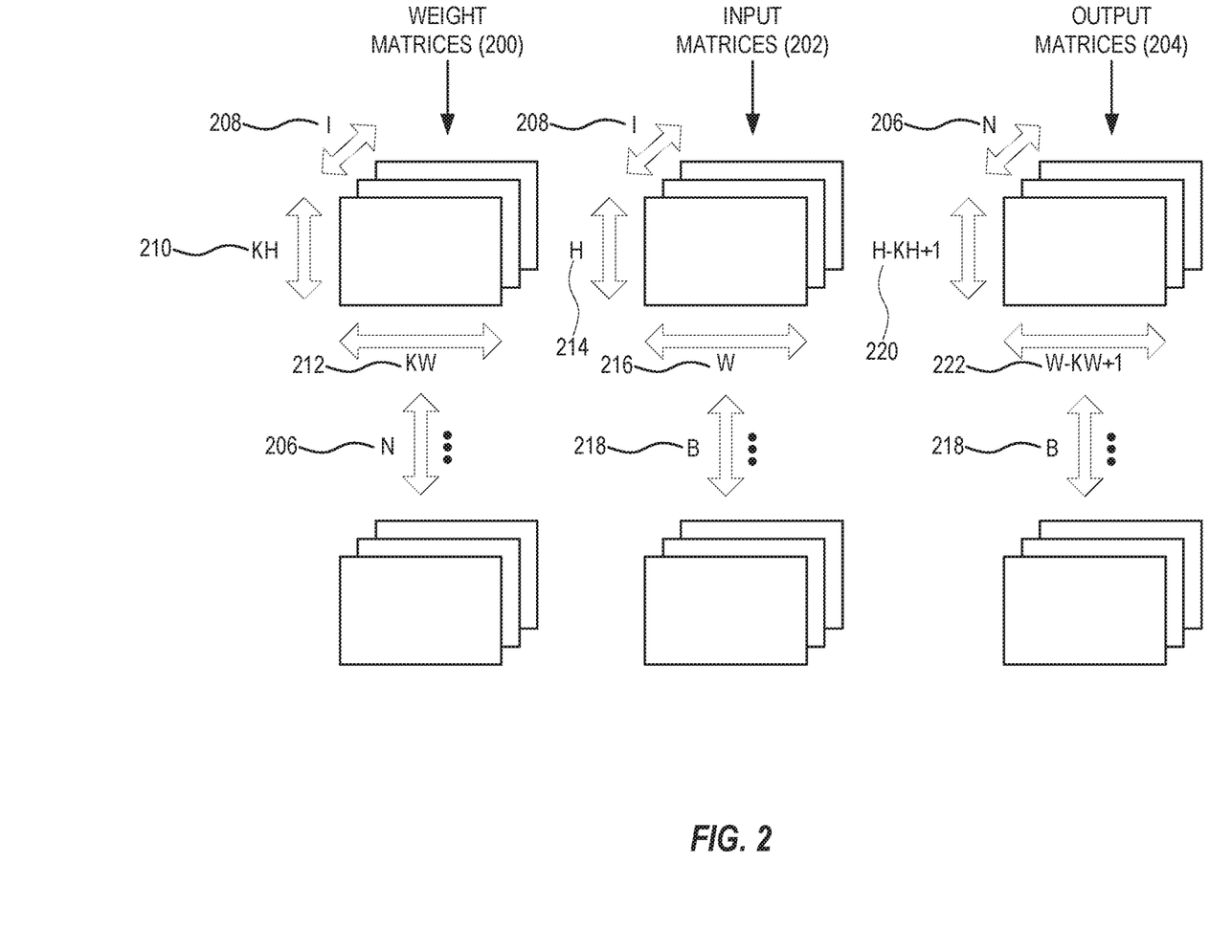
FIG. 2 is a block diagram illustrating exemplary weight matrices, input matrices, and output matrices involved in convolution operations, along with their associated dimensions.

As noted above, the process of neural network convolution, which involves image processing by adding each element of an input image to its local neighbors and weighting by a kernel, presents particular challenges to providing flexible, efficient processing. To illustrate exemplary weight matrices, input matrices, and output matrices involved in convolution operations, along with their associated dimensions, FIG. 2 is provided. As seen in FIG. 2, a set of weight matrices 200 and a set of input matrices 202 are to be processed to generate a set of output matrices 204, with the weight matrices 200, the input matrices 202, and the output matrices 204 understood to each comprise a plurality of matrices. The weight matrices 200 each represents an image processing kernel (e.g., feature detection, used for generating image effects such as blurring, sharpening, edge detection, and/or the like), while the input matrices 202 each contain image data to which the weight matrices 200 are to be applied.

The weight matrices 200, the input matrices 202, and the output matrices 204 can be defined and described by reference to numbers N, I, KH, KW, H, W, and B, each representing a dimension of the matrices. The number N, indicated by element 206 in FIG. 2, represents a number of output features, such as image effects to be applied to the images represented by the input matrices 202, as a non-limiting example. The number I, indicated by element 208 in FIG. 2, represents a number of input features or channels corresponding to properties of individual pixels within the images represented by the input matrices 202. The numbers indicated by KH (indicated by element 210) and KW (indicated by element 212) represent kernel height and kernel width, respectively, of the image processing kernels represented by the weight matrices 200. The numbers H (indicated by element 214) and W (indicated by element 216) represent the height and width dimensions, respectively, of the input matrices 202. The number B, indicated by element 218 of FIG. 2, represents how many batches of inputs (i.e., how many groups of the number I of the input matrices 202) are to be processed. As seen in FIG. 2, the above-noted dimensions associated with the weight matrices 200 and the input matrices 202 can be used to determine the dimensions associated with the output matrices 204. In particular, the output matrices 204 comprise the number B batches, as indicated by element 218, each including the number N of the output matrices 204. Each individual output matrix of the output matrices 204 has a height of H−KH+1, as indicated by element 220, and a width of W−KW+1, as indicated by element 222.

Figure 3:
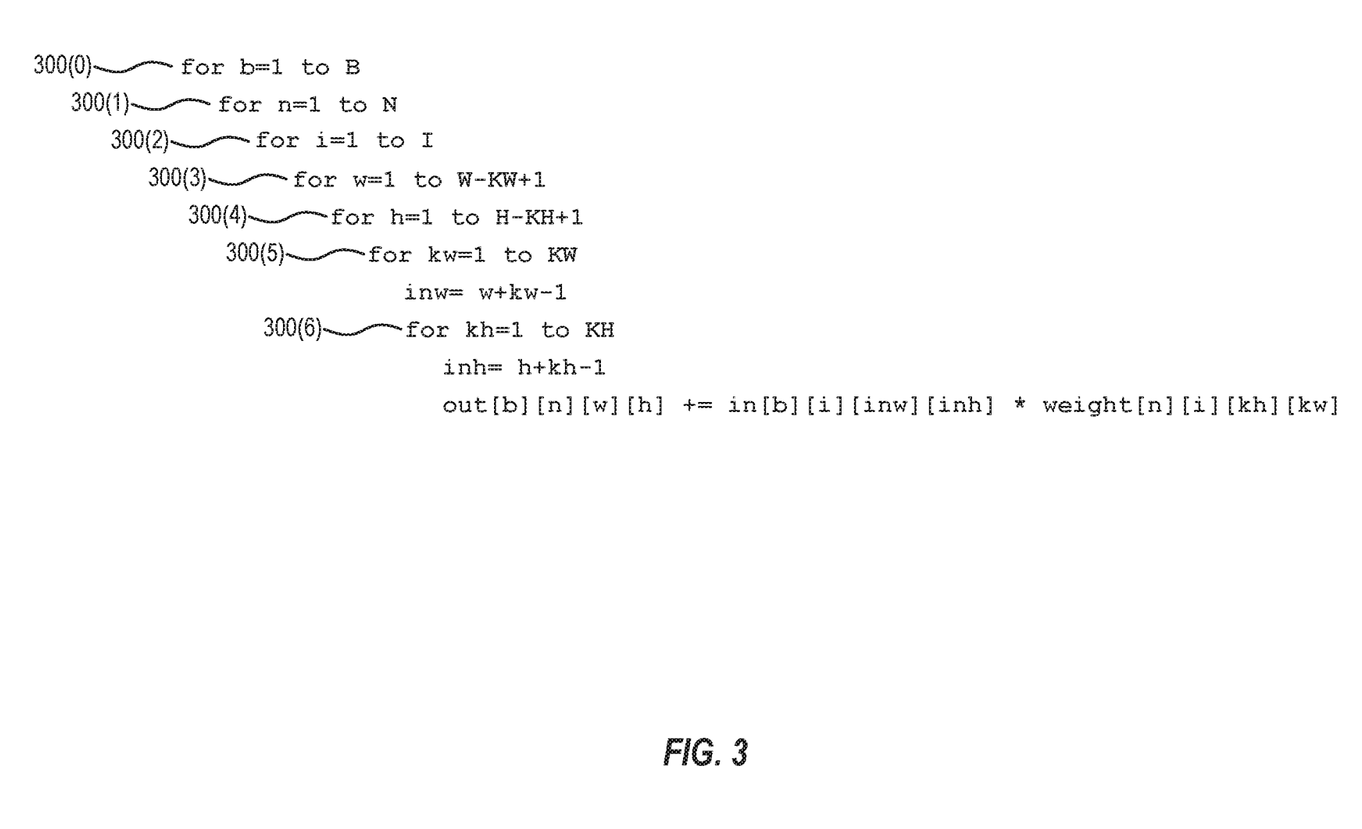
FIG. 3 is a diagram illustrating exemplary nested loops used for performing convolution operations by conventional processor-based devices.

A conventional algorithm for performing convolution using the weight matrices 200, the input matrices 202, and the output matrices 204 of FIG. 2 may be represented by a set of nested loops 300(0)-300(6) shown in FIG. 3. As seen in FIG. 3, each of the nested loops 300(0)-300(6) corresponds to one of the dimensions described above with respect to FIG. 2. In particular, the nested loops 300(0)-300(6), in order from outermost loop to innermost loop, correspond to the dimensions B, N, I, W, H, KW, and KH, and thus may be represented as B→N→I→W→H→KW→KH, indicating the level of the nested loops in which each dimension indicates the upper bound of the corresponding loop. Note that, because the multiplication/accumulation operations performed as part of convolution are associative, all permutations of these loop variables are legal and produce the same results (ignoring precision effects). For example, a set of nested loops represented by the notation N→B→I→KW→KH→W→H would produce the same result as the set of nested loops 300(0)-300(6) shown in FIG. 3. However, variations may have an impact on how data may be reused, which ultimately may affect memory bandwidth. Tiling may be used to keep the input matrices 202 or the output matrices 204 local, and can result in additional looping layers (e.g., BB→NN→II→B→N→I→W→H→KW→KH, as a non-limiting example, where BB, NN, and II represent stride values).

In this regard, the matrix-processor-based device 100 of FIGS. 1A and 1B is configured to take advantage of the regularity of the batch dimension (i.e., B) and feature dimensions (i.e., I and N) common in neural networks to better optimize neural network convolutional processing. As discussed in greater detail below, the matrix-processor-based device 100 identifies and separates the regular and irregular dimensions of the weight matrices 200 and the input matrices 202 of FIG. 2, assigns the regular dimensions to a matrix processor of the plurality of matrix processors 144(0)-144(M) for processing, and assigns the irregular dimensions to instructions executed by the CPU 146 of the matrix-processor-based device 100. This approach allows the matrix processors 144(0)-144(M) to take advantage of the regularity of the batch and feature dimensions common in neural networks, and assigns the irregular dimensions of height, width, and striding to be handled by instructions executed by the CPU 146. In this manner, the matrix-processor-based device 100 maintains the flexibility to accommodate many convolution variations, and may be used to process fully connected layers and recurrent neural networks (RNNs) as well.

Figure 4A:
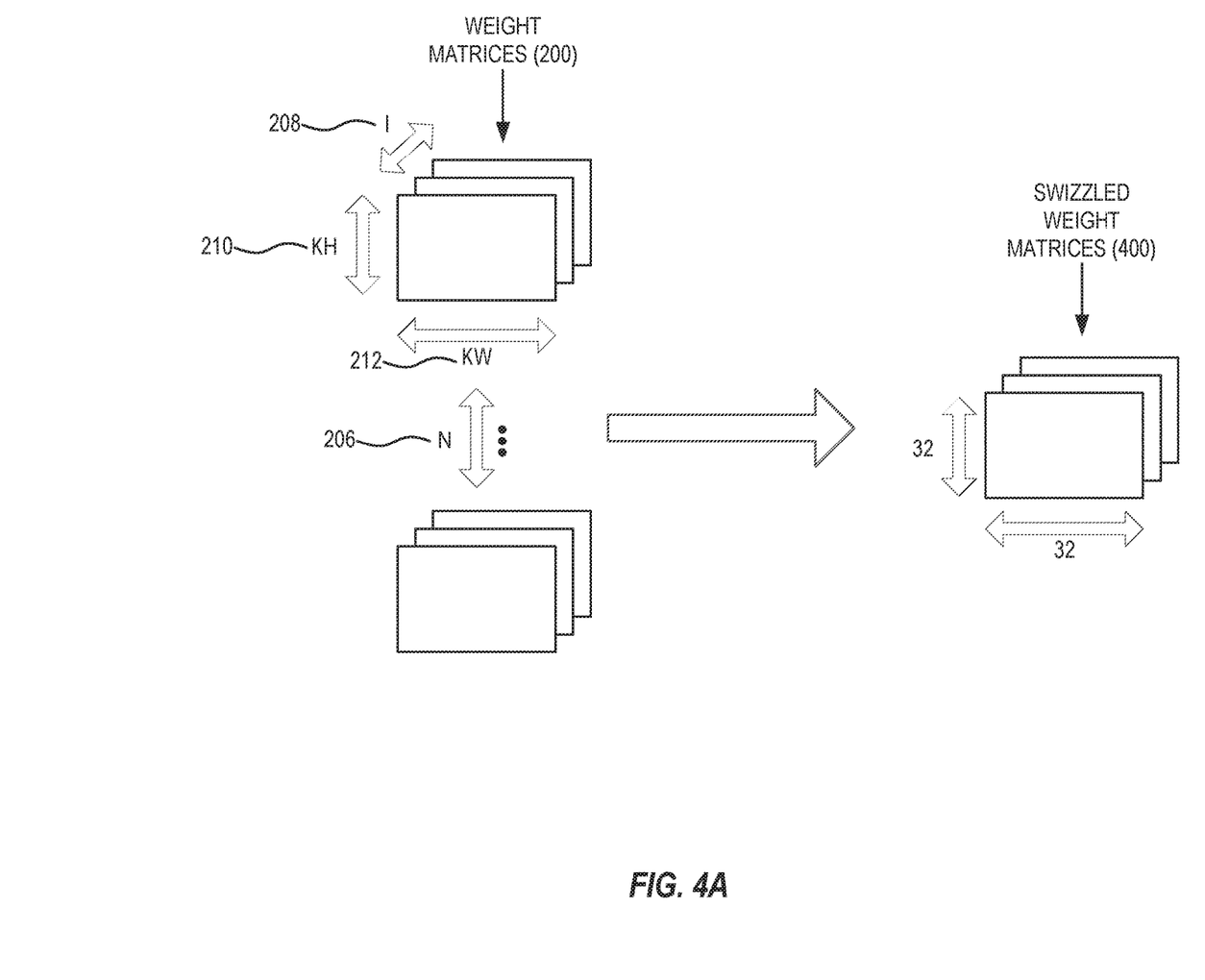
FIGS. 4A-4C are block diagrams illustrating exemplary operations of the matrix-processor-based device of FIGS. 1A and 1B for handling neural network convolution by separating regular and irregular dimensions of matrices representing neural network layers for processing by hardware and software, respectively.
Figure 4B:
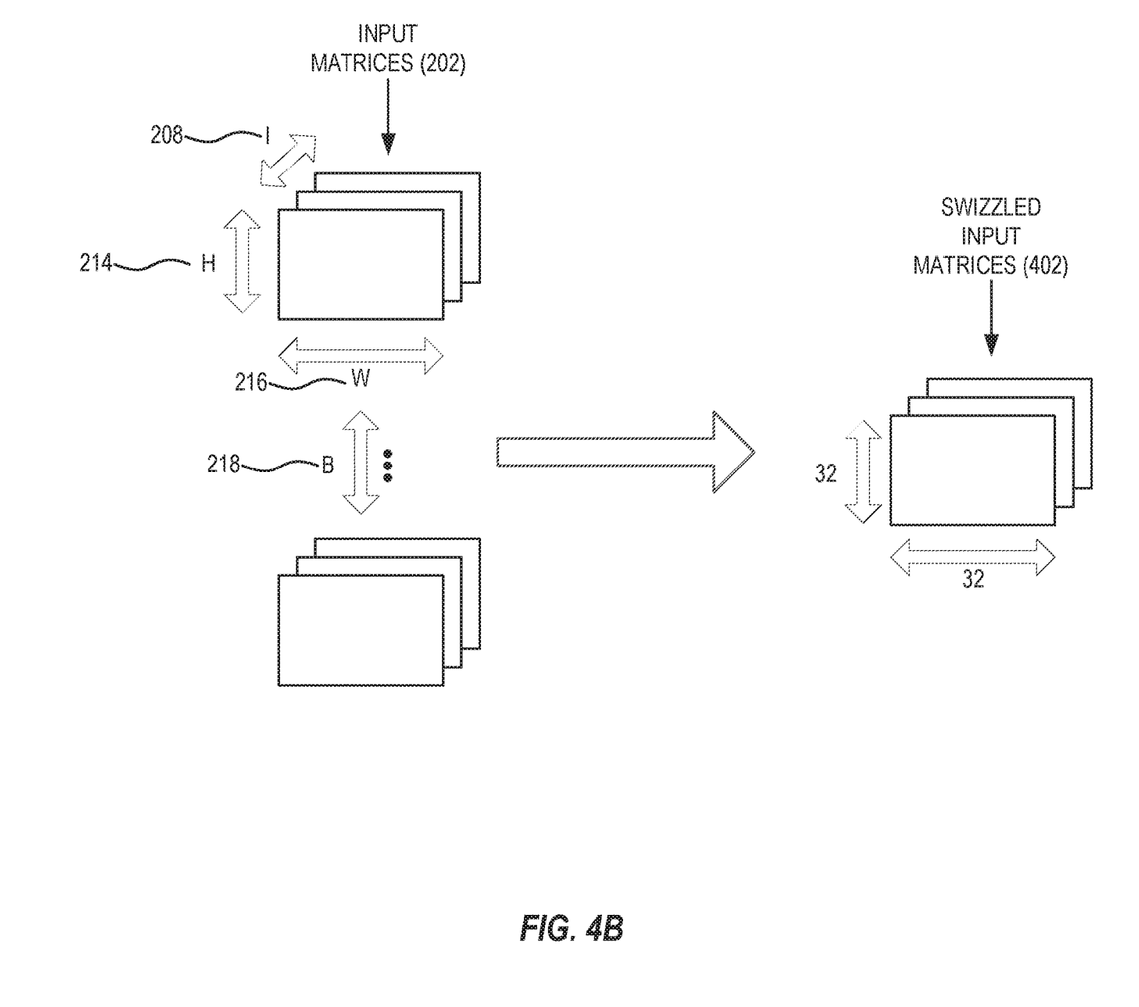
Figure 4C:
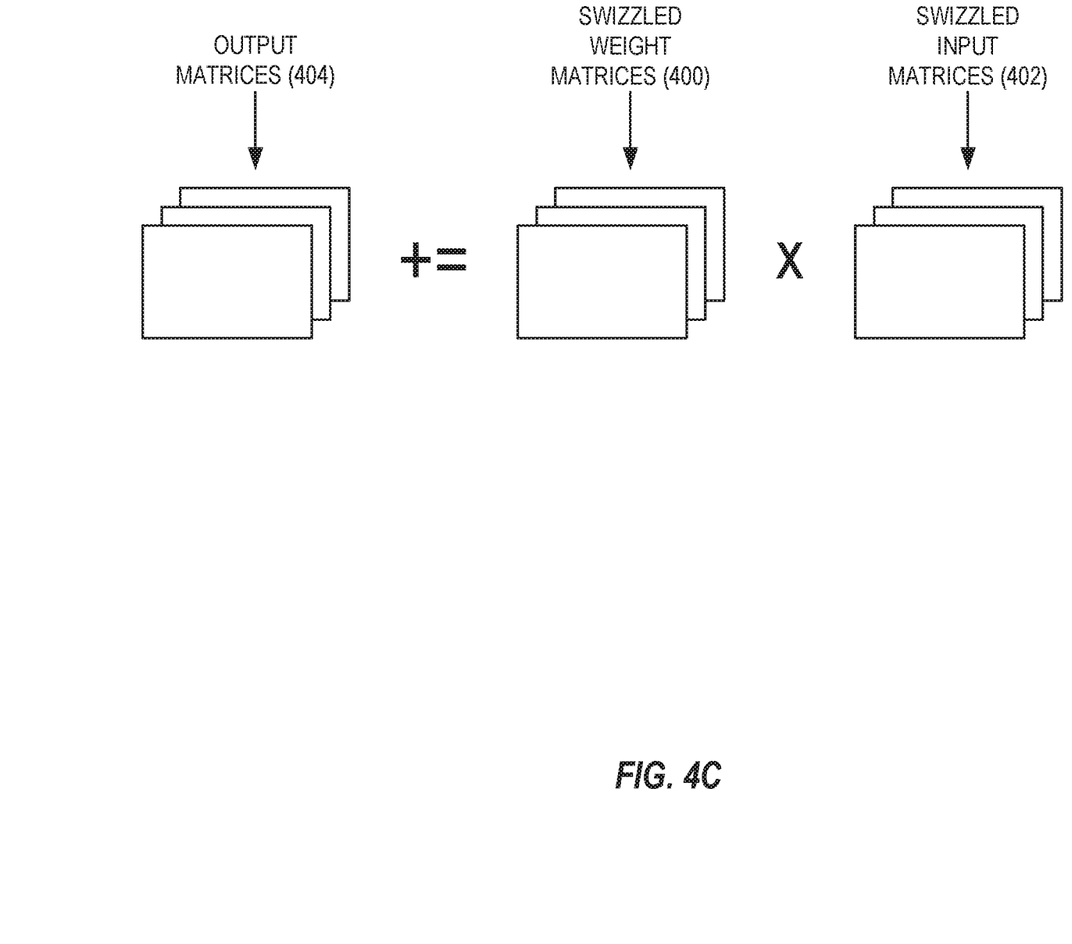

To illustrate exemplary operations for providing flexible and efficient neural network convolution processing, FIGS. 4A-4C are provided. Referring to FIG. 4A, a first step involves "swizzling" or reorganizing the elements of the weight matrices 200 of FIG. 2. In the example of FIG. 4A, assume that KH and KW both have a value of three (3), indicating that the weight matrices 200 comprise 3×3 matrices. N is assumed to have a value of 256, while I is assumed to have a value of 128. To swizzle the weight matrices 200 in this example, the weight matrices 200 are reorganized into swizzled weight matrices 400 comprising 32×32 matrices, to match dimensions natively supported by the matrix processors 144(0)-144(M) of FIGS. 1A and 1B. Thus, in the example of FIG. 4A, the swizzled weight matrices 400 comprise 288 weight matrices (i.e., 9 (3×3) sets for the convolution kernel, multiplied by 8 (256/32) sets for the output features, multiplied by 4 (128/32) sets for the input features). As a non-limiting example, the 288 swizzled weight matrices 400 may be conceptualized as tiles of dimensions 32×32 (natively supported by the matrix processors 144(0)-144(M)) arranged in row-major order to form a larger two-dimensional matrix having I (i.e., 128) rows and KH*KW*N (i.e., 2,304) columns, with each column storing all values of a given row and column of each of the weight matrices 200 for each input feature. The swizzling of the weight matrices 200 into the swizzled weight matrices 400 need only occur a single time.

As seen in FIG. 4B, a next step is to reorganize the input matrices 202 of FIG. 2 to generate swizzled input matrices 402, which also comprise 32×32 matrices. In the example of FIG. 4B, H and W are each assumed to have a value of 28, while I is assumed to have a value of 128 and B is assumed to have a value of 32. The swizzled input matrices 402 thus comprise 3,136 input matrices (i.e., 784 (28×28) sets for the input matrices 202, multiplied by 4 (128/32) sets for the input features, multiplied by 1 (32/32) set for the batch size). Similar to the swizzled weight matrices 400, the swizzled input matrices 402 in some aspects may be conceptualized as tiles of dimensions 32×32 arranged in column-major order to form a larger two-dimensional matrix having I (i.e., 128) rows and H*W*B (i.e., 25,088) columns, with each column storing all values of a given row and column of each of the input matrices 202 for each input feature.

Finally, as shown in FIG. 4C, the neural net calculations, in which the swizzled weight matrices 400 are multiplied by the swizzled input matrices 402 to generate output matrices 404, is carried out layer by layer. Using the parameters indicated above with respect to FIGS. 4A and 4B, the output matrices 404 comprise a total of 6,272 32×32 column-major output matrices (i.e., 784 (32×32) set for the output size, multiplied by 8 (256/32) sets for the output features, multiplied by 1 (32/32) sets for the batch size). After the matrix multiplication operations are complete, the output matrices 404 are ready for processing within a next layer, if any, without any further swizzling required.

Figure 5:
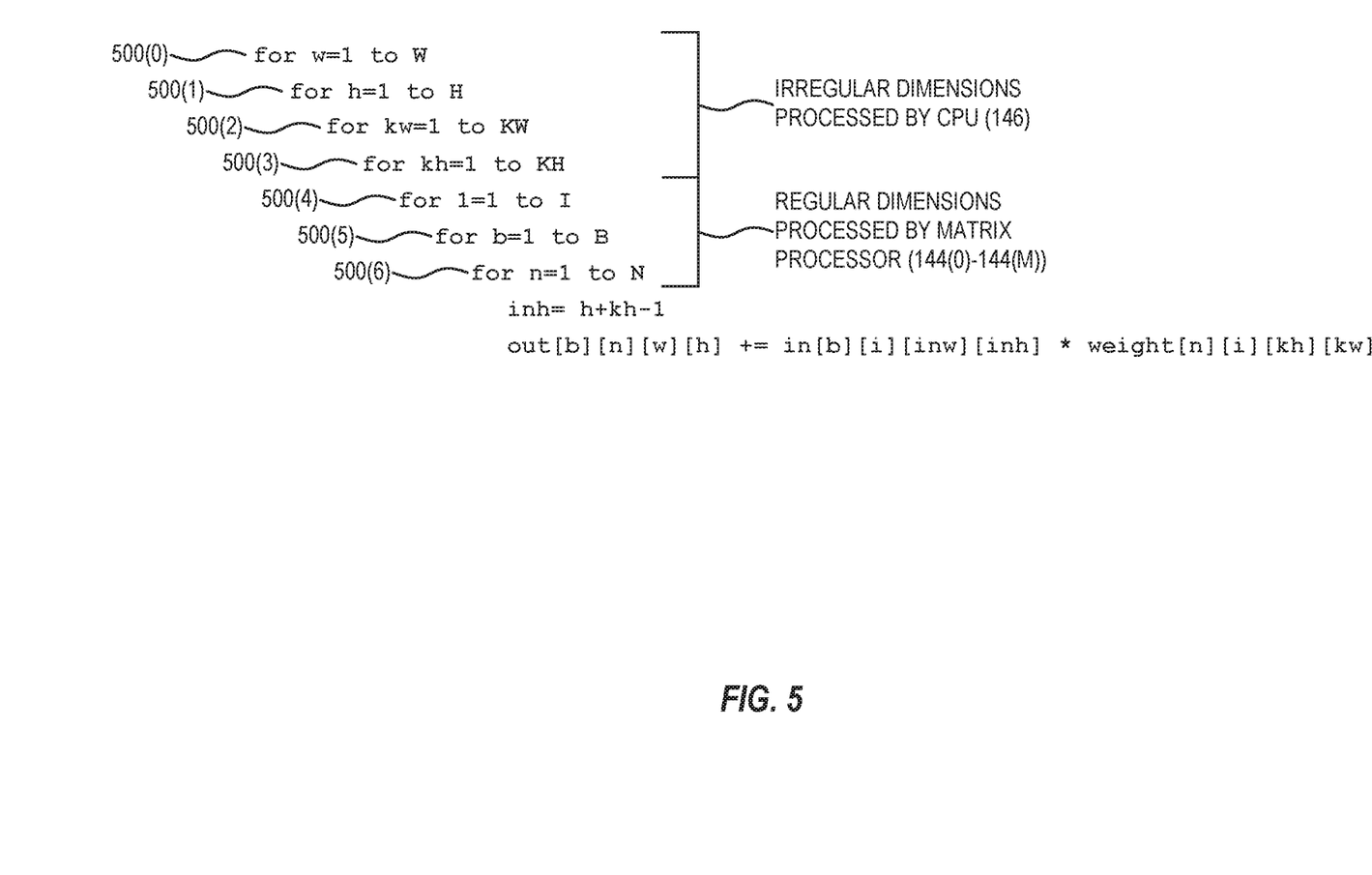
FIG. 5 is a diagram illustrating exemplary nested loops corresponding to irregular dimensions that are processed by software-executed instructions and nested loops corresponding to regular dimensions that are processed by a matrix processor of the matrix-processor-based device of FIGS. 1A and 1B.

The convolution process described above with respect to FIGS. 4A-4C allows the regular and irregular dimensions of the weight matrices 200 and the input matrices 202 to be separately processed. The regular dimensions (represented by dimensions I→B→N) are assigned to one of the matrix processors 144(0)-144(M), as the input feature dimension, the output feature dimension, and the batch dimension generally are multiples of 16 or 32 and thus correspond in size to predetermined hardware resource sizes. The irregular dimensions (e.g., those corresponding to kernel width, kernel height, and/or stride values, as non-limiting examples) are assigned to be processed using instructions executing nested loops to form the convolution and perform summation of the results. Thus, for example, in nested loops 500(0)-500(6) illustrated in FIG. 5, matrix multiplication/accumulation operations within the nested loops 500(4)-500(6), which together correspond to the regular dimensions I, B, and N, are performed by the matrix processors 144(0)-144(M), while the outer nested loops 500(0)-500(3) are processed using instructions executed by the CPU 146.

In some aspects, padding may be added to the outer edges of the input matrices 202 to preserve the H and W dimensions across the convolution. In such aspects, only loop control instructions need to be added to the portion of processing carried out by instructions executed by the CPU 146, while the portion of processing performed by the matrix processors 144(0)-144(M) is not affected. Some aspects may employ a vector processor, such as the vector processor 142 of FIGS. 1A and 1B, in addition to the matrix processors 144(0)-144(M) of FIGS. 1A and 1B. In such aspects, the batch dimension B may be eliminated from hardware processing, but at a cost of reduced efficiency. According to some aspects, the matrix processors 144(0)-144(M) may provide native support dimensions other than 32×32 as described herein. As a non-limiting example, the matrix processors 144(0)-144(M) may natively support matrix dimensions of 16×16 instead of or in addition to supporting matrix dimensions of 32×32, and/or may natively support matrices having dimensions that comprise multiples of 16 or 32. Some aspects may provide that RNNs and fully connected layers may be processed using the same matrix processors 144(0)-144(M).

In some aspects, the batch dimension B for convolution operations may be reduced by being combined with the input width dimension W of the input matrices 202 or the input height dimension H of the input matrices 202. Consider, for instance, the example discussed above with respect to FIG. 4B, in which B is assumed to have a value of 32. Each of the 32×32 swizzled input matrices 402 of FIG. 4B may store values of a given row and column of each of the input matrices 202 over all 32 batches and a subset of size 32 of the I input features. However, in aspects in which it may be desirable to reduce the batch dimension B to a value of 16 (as a non-limiting example), each of the resulting 32×32 swizzled input matrices 402 may store, for example, the values of two (2) columns of a given row over 16 batches each, instead of the values of a given row and column over all 32 batches.

Figure 6:
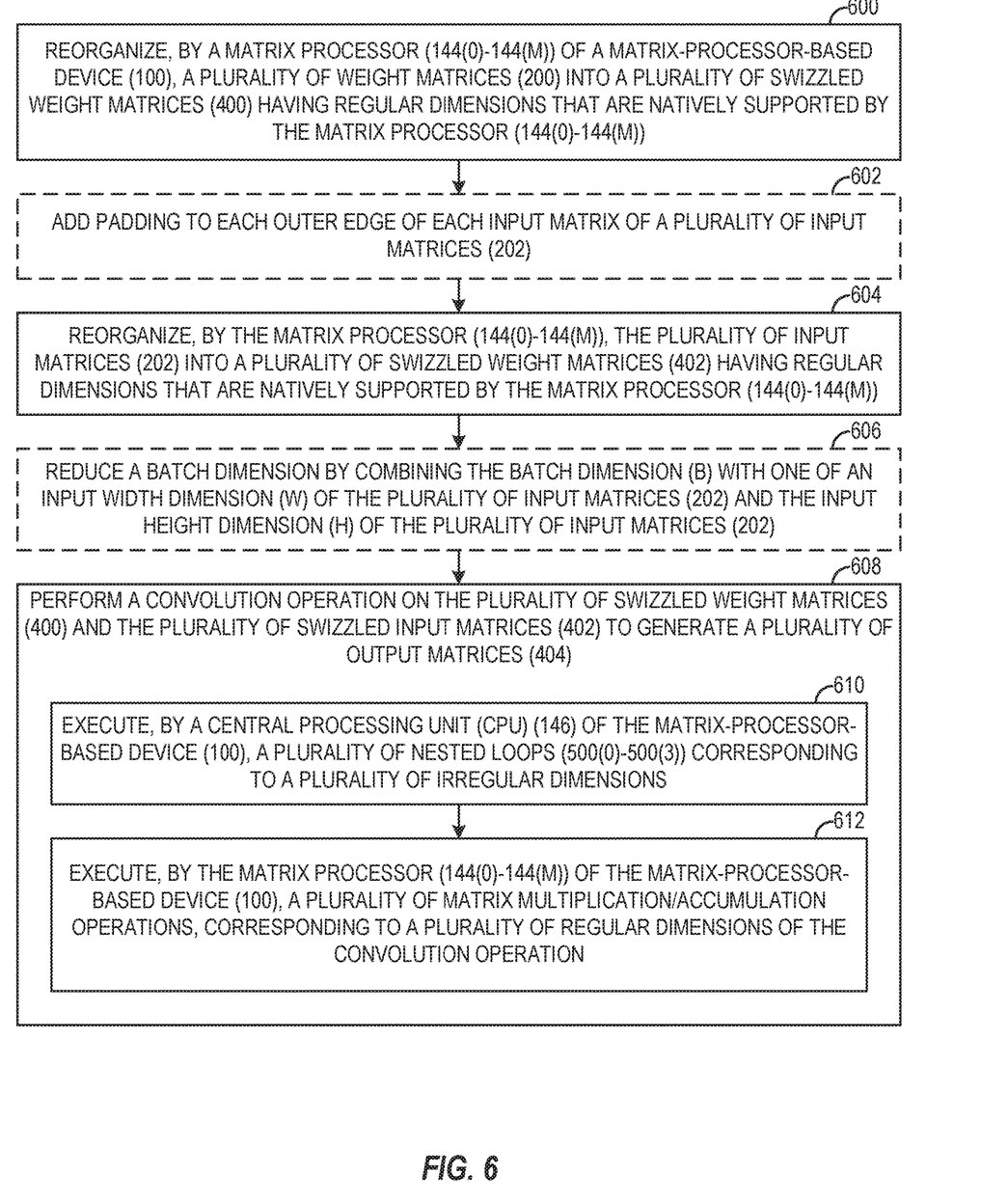
FIG. 6 is a flowchart illustrating exemplary operations of the matrix-processor-based device of FIGS. 1A and 1B for providing flexible matrix processors.

To illustrate exemplary operations of the matrix-processor-based device 100 of FIGS. 1A and 1B for performing neural network convolution, FIG. 6 is provided. For the sake of clarity, elements of FIGS. 1A, 1B, 2, and 4A-4C are referenced in describing FIG. 6. Operations in FIG. 6 begin with a matrix processor, such as one of the matrix processors 144(0)-144(M), reorganizing the plurality of weight matrices 200 into the plurality of swizzled weight matrices 400 having regular dimensions that are natively supported by the matrix processor 144(0)-144(M) (block 600). In this regard, the matrix processor 144(0)-144(M) may be referred to herein as "a means for reorganizing a plurality of weight matrices into a plurality of swizzled weight matrices having regular dimensions that are natively supported by a matrix processor of the matrix-processor-based device." In some aspects, the matrix processor 144(0)-144(M) may add padding to each outer edge of each input matrix of the plurality of input matrices 202 (block 602). Accordingly, the matrix processor 144(0)-144(M) may be referred to herein as "a means for adding padding to each outer edge of each input matrix of the plurality of input matrices."

The matrix processor 144(0)-144(M) also reorganizes the plurality of input matrices 202 into the plurality of swizzled weight matrices 402 having regular dimensions that are natively supported by the matrix processor 144(0)-144(M) (block 604). The matrix processor 144(0)-144(M) thus may be referred to herein as "a means for reorganizing a plurality of input matrices into a plurality of swizzled input matrices having regular dimensions that are natively supported by the matrix processor." Some aspects may provide that the matrix processor 144(0)-144(M) may reduce the batch dimension B by combining the batch dimension B with one of the input width dimension W of the plurality of input matrices 202 and the input height dimension H of the plurality of input matrices 202 (block 606). In this regard, the matrix processor 144(0)-144(M) may be referred to herein as "a means for reducing a batch dimension by combining the batch dimension with one of an input width dimension of the plurality of input matrices and an input height dimension of the plurality of input matrices."

The matrix-processor-based device 100 then performs a convolution operation on the plurality of swizzled weight matrices 400 and the plurality of swizzled input matrices 402 to generate a plurality of output matrices 404 (block 608). Accordingly, the matrix-processor-based device 100 may be referred to herein as "a means for performing a convolution operation on the plurality of swizzled weight matrices and the plurality of swizzled input matrices to generate a plurality of output matrices." The operations of block 608 for performing the convolution operation include the CPU 146 executing the plurality of nested loops 500(0)-500(3) corresponding to the plurality of irregular dimensions (block 610). The CPU 146 thus may be referred to herein as "a means for executing a plurality of nested loops corresponding to a plurality of irregular dimensions." Additionally, the matrix processor 144(0)-144(M) executes a plurality of matrix multiplication/accumulation operations, corresponding to the plurality of regular dimensions of the convolution operation (block 612). In this regard, the matrix processor 144(0)-144(M) may be referred to herein as "a means for executing a plurality of matrix multiplication/accumulation operations, corresponding to a plurality of regular dimensions of the convolution operation."

Providing flexible matrix processors for performing neural network convolution in matrix-processor-based devices according to aspects disclosed herein may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

Figure 7:
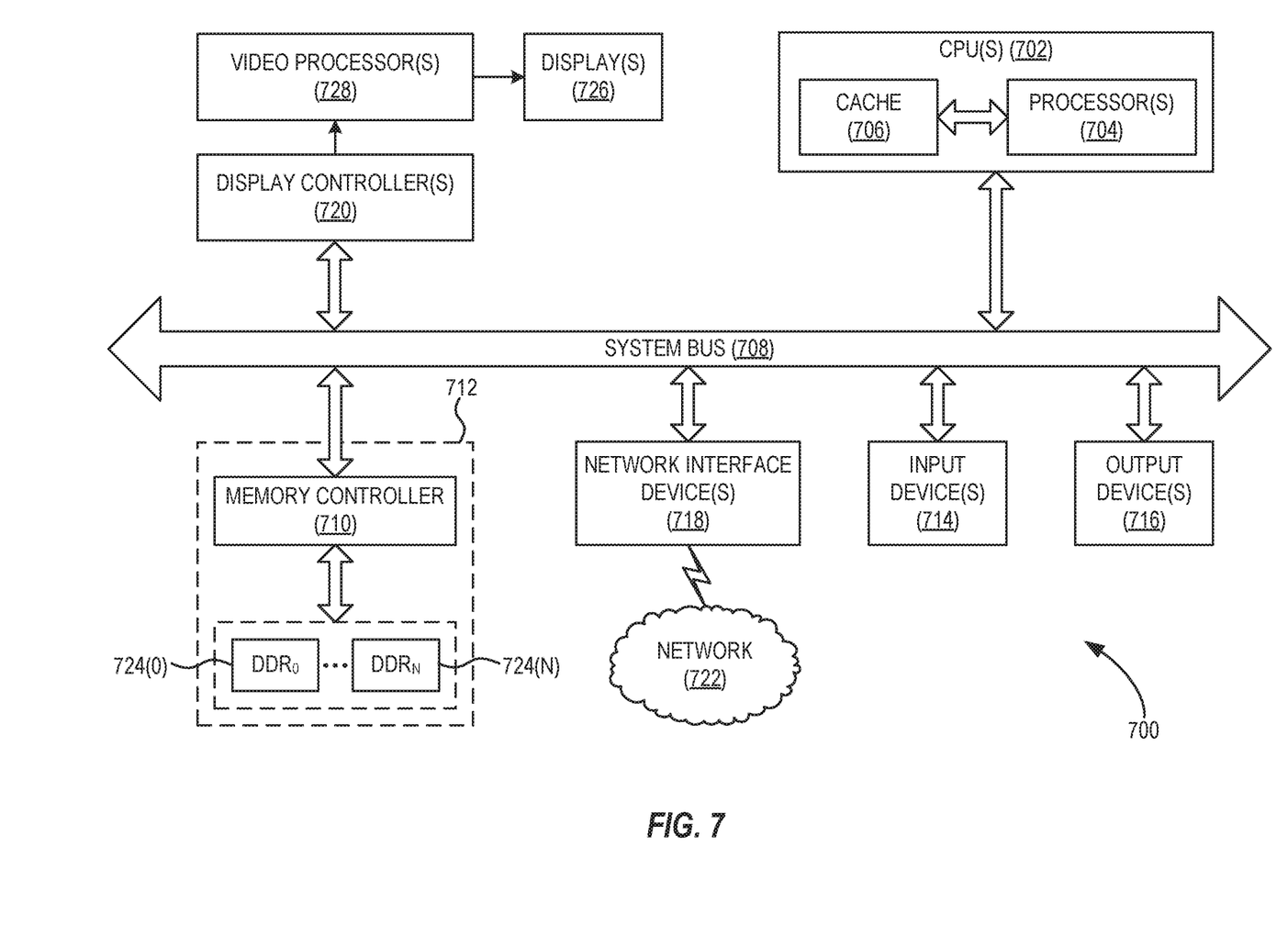
FIG. 7 is a block diagram of an exemplary processor-based system that can comprise the matrix-processor-based device of FIGS. 1A and 1B for providing flexible matrix processors.

In this regard, FIG. 7 illustrates an example of a processor-based system 700 that may comprise the matrix-processor-based device 100 of FIGS. 1A and 1B. The processor-based system 700 includes one or more CPUs 702, each including one or more processors 704. The CPU(s) 702 may have cache memory 706 coupled to the processor(s) 704 for rapid access to temporarily stored data. The CPU(s) 702 is coupled to a system bus 708 and can intercouple master and slave devices included in the processor-based system 700. As is well known, the CPU(s) 702 communicates with these other devices by exchanging address, control, and data information over the system bus 708. For example, the CPU(s) 702 can communicate bus transaction requests to a memory controller 710 as an example of a slave device.

Other master and slave devices can be connected to the system bus 708. As illustrated in FIG. 7, these devices can include a memory system 712, one or more input devices 714, one or more output devices 716, one or more network interface devices 718, and one or more display controllers 720, as examples. The input device(s) 714 can include any type of input device, including, but not limited to, input keys, switches, voice processors, etc. The output device(s) 716 can include any type of output device, including, but not limited to, audio, video, other visual indicators, etc. The network interface device(s) 718 can be any devices configured to allow exchange of data to and from a network 722. The network 722 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 718 can be configured to support any type of communications protocol desired. The memory system 712 can include one or more memory units 724(0)-724(N).

The CPU(s) 702 may also be configured to access the display controller(s) 720 over the system bus 708 to control information sent to one or more displays 726. The display controller(s) 720 sends information to the display(s) 726 to be displayed via one or more video processors 728, which process the information to be displayed into a format suitable for the display(s) 726. The display(s) 726 can include any type of display, including, but not limited to, a cathode ray tube (CRT), a liquid crystal display (LCD), a plasma display, etc.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The master devices, and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein, but is to be accorded the widest scope consistent with the principles and novel features disclosed herein.

What is claimed is:

1. A matrix-processor-based device for performing neural network convolution, comprising:
   a central processing unit (CPU); and
   a matrix processor configured to:
   reorganize a plurality of weight matrices, each comprising at least one irregular dimension, into a plurality of swizzled weight matrices that each have regular dimensions that are multiples of native dimensions natively supported by the matrix processor, wherein each irregular dimension is a dimension other than one of the regular dimensions; and
   reorganize a plurality of input matrices, each comprising at least one irregular dimension, into a plurality of swizzled input matrices that each have dimensions from among the regular dimensions; and
   the matrix-processor-based device configured to perform a convolution operation on the plurality of swizzled weight matrices and the plurality of swizzled input matrices to generate a plurality of output matrices by being configured to:
   execute, by the CPU of the matrix-processor-based device, a plurality of nested loops of the convolution operation corresponding to a plurality of the irregular dimensions; and
   execute, by the matrix processor of the matrix-processor-based device, a plurality of matrix multiplication/accumulation operations of the convolution operation corresponding to a plurality of the regular dimensions.

2. The matrix-processor-based device of claim 1, wherein the plurality of the regular dimensions corresponds to one or more of:
   a plurality of input features of the plurality of input matrices;
   a plurality of batches of the plurality of input matrices; and
   a plurality of output features of the plurality of weight matrices.

3. The matrix-processor-based device of claim 1, wherein the plurality of the irregular dimensions comprises one or more of a kernel width of the plurality of weight matrices, a kernel height of the plurality of weight matrices, and one or more stride values.

4. The matrix-processor-based device of claim 1, wherein the regular dimensions that are natively supported by the matrix processor comprise one of multiples of 16 and multiples of 32.

5. The matrix-processor-based device of claim 1, wherein:
   the matrix processor is further configured to add padding to each outer edge of each input matrix of the plurality of input matrices; and
   the plurality of nested loops corresponding to the plurality of the irregular dimensions comprises loop control instructions executed by the CPU of the matrix-processor-based device.

6. The matrix-processor-based device of claim 1, wherein the matrix processor is further configured to reduce a batch dimension by being configured to combine the batch dimension with one of an input width dimension of the plurality of input matrices and an input height dimension of the plurality of input matrices.

7. The matrix-processor-based device of claim 1 integrated into an integrated circuit (IC).

8. The matrix-processor-based device of claim 1 integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

9. A matrix-processor-based device for performing neural network convolution, comprising:
   a means for reorganizing a plurality of weight matrices, each comprising at least one irregular dimension, into a plurality of swizzled weight matrices that each have regular dimensions that are multiples of native dimensions natively supported by a matrix processor of the matrix-processor-based device, wherein each irregular dimension is a dimension other than one of the regular dimensions;
   a means for reorganizing a plurality of input matrices, each comprising at least one irregular dimension, into a plurality of swizzled input matrices that each have dimensions from among the regular dimensions; and a means for performing a convolution operation on the plurality of swizzled weight matrices and the plurality of swizzled input matrices to generate a plurality of output matrices, wherein the means for performing the convolution operation comprises:
 a means for executing a plurality of nested loops corresponding to a plurality of the irregular dimensions; and
 a means for executing a plurality of matrix multiplication/accumulation operations of the convolution operation corresponding to a plurality of the regular dimensions.

10. The matrix-processor-based device of claim 9, wherein the plurality of the regular dimensions corresponds to one or more of:
 a plurality of input features of the plurality of input matrices;
 a plurality of batches of the plurality of input matrices; and
 a plurality of output features of the plurality of weight matrices.

11. The matrix-processor-based device of claim 9, wherein the plurality of the irregular dimensions comprises one or more of a kernel width of the plurality of weight matrices, a kernel height of the plurality of weight matrices, and one or more stride values.

12. The matrix-processor-based device of claim 9, wherein the regular dimensions that are natively supported by the matrix processor comprise one of multiples of 16 and multiples of 32.

13. The matrix-processor-based device of claim 9, wherein:
 the matrix-processor-based device further comprises a means for adding padding to each outer edge of each input matrix of the plurality of input matrices; and
 the plurality of nested loops corresponding to the plurality of the irregular dimensions comprises loop control instructions.

14. The matrix-processor-based device of claim 9, further comprising a means for reducing a batch dimension by combining the batch dimension with one of an input width dimension of the plurality of input matrices and an input height dimension of the plurality of input matrices.

15. A method for performing neural network convolution, comprising:
 reorganizing, by a matrix processor of a matrix-processor-based device, a plurality of weight matrices, each comprising at least one irregular dimension, into a plurality of swizzled weight matrices that each have regular dimensions that are multiples of native dimensions natively supported by the matrix processor wherein each irregular dimension is a dimension other than one of the regular dimensions;
 reorganizing, by the matrix processor, a plurality of input matrices each comprising at least one irregular dimension, into a plurality of swizzled input matrices that each have dimensions from among the regular dimensions; and
 performing a convolution operation on the plurality of swizzled weight matrices and the plurality of swizzled input matrices to generate a plurality of output matrices, wherein performing the convolution operation comprises:
  executing, by a central processing unit (CPU) of the matrix-processor-based device, a plurality of nested loops corresponding to a plurality of the irregular dimensions; and
  executing, by the matrix processor of the matrix-processor-based device, a plurality of matrix multiplication/accumulation operations of the convolution operation corresponding to a plurality of the regular dimensions.

16. The method of claim 15, wherein the plurality of the regular dimensions corresponds to one or more of:
 a plurality of input features of the plurality of input matrices;
 a plurality of batches of the plurality of input matrices; and
 a plurality of output features of the plurality of weight matrices.

17. The method of claim 15, wherein the plurality of the irregular dimensions comprises one or more of a kernel width of the plurality of weight matrices, a kernel height of the plurality of weight matrices, and one or more stride values.

18. The method of claim 15, wherein the regular dimensions that are natively supported by the matrix processor comprise one of multiples of 16 and multiples of 32.

19. The method of claim 15, wherein:
 the method further comprises adding padding to each outer edge of each input matrix of the plurality of input matrices; and
 the plurality of nested loops corresponding to the plurality of the irregular dimensions comprises loop control instructions executed by the CPU of the matrix-processor-based device.

20. The method of claim 15, further comprising reducing a batch dimension by combining the batch dimension with one of an input width dimension of the plurality of input matrices and an input height dimension of the plurality of input matrices.

* * * * *